(12) United States Patent
Cottaar

(10) Patent No.: US 6,476,556 B2
(45) Date of Patent: Nov. 5, 2002

(54) ELECTRIC LAMP AND INTERFERENCE FILM

(75) Inventor: Eduardus Johannes Emiel Cottaar, Heerlen (NL)

(73) Assignee: Koninklijke Philips Electronics N.V. (NL)

(*) Notice: Subject to any disclaimer, the term of this patent is extended or adjusted under 35 U.S.C. 154(b) by 87 days.

(21) Appl. No.: 09/772,005

(22) Filed: Jan. 29, 2001

(65) Prior Publication Data
US 2001/0020821 A1 Sep. 13, 2001

(30) Foreign Application Priority Data

Feb. 3, 2000 (EP) .............................. 00200368

(51) Int. Cl.⁷ ............................................... H01J 17/16
(52) U.S. Cl. ...................................... 313/635; 313/112
(58) Field of Search .............................. 313/110, 111, 313/112, 635; 359/359

(56) References Cited

U.S. PATENT DOCUMENTS 5,138,219 A 8/1992 Krisl et al. ................. 313/112
5,705,882 A 1/1998 Oughton ..................... 313/112

*Primary Examiner*—Vip Patel
(74) *Attorney, Agent, or Firm*—Frank Keegan

(57) ABSTRACT

Optical interference coatings applied to electric lamps for transmitting, on average, 90% of the visible light radiation in the wavelength range from 400 to 760 nm and for reflecting infrared radiation, comprise three spectrally adjacent multilayer stacks of alternately a first layer (L) of a material having a low refractive index and a second layer (H) of a material having a high refractive index. According to the invention, the reflectance of the interference film amounts, on average, to at least 75% in the wavelength range from 800 to 2200 nm, whereas the transmittance amounts, on average, to at least 90% in the wavelength range from 400 to 760 nm. Preferably, the reflectance of the interference coating amounts, on average, to at least 85% in the wavelength range from 800 to 2500 nm. The first stack $S_1$ (design wavelength $\lambda(S_1)$ 2100 nm) of the interference film as shown in FIG. 2 is based on a design comprising eleven layers of alternately a high and a low refractive index material.

8 Claims, 3 Drawing Sheets

ELECTRIC LAMP AND INTERFERENCE FILM

Figure 1:
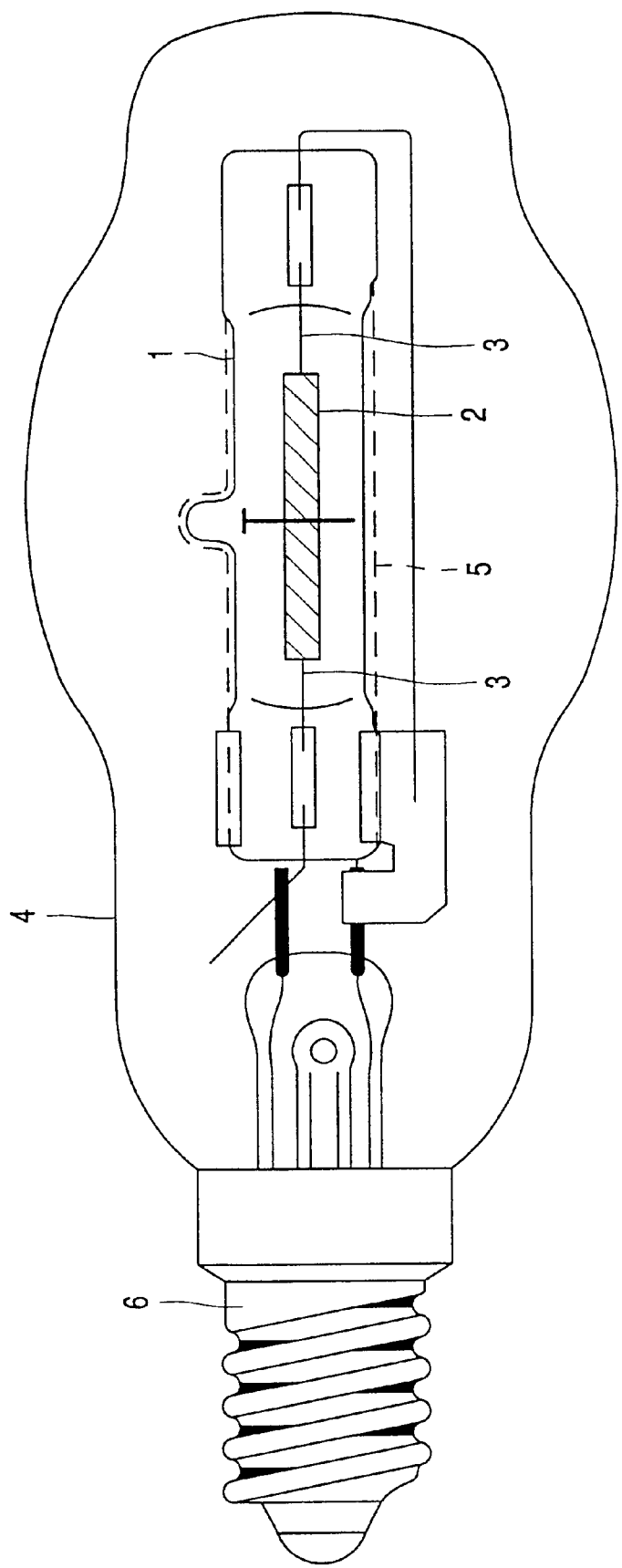

The invention relates to an electric lamp comprising a light-transmitting lamp vessel in which a light source is arranged,
  wherein at least a portion of the lamp vessel is provided with an interference film for allowing passage of visible-light radiation and reflecting infrared radiation,
  wherein the interference film comprises layers which are arranged such that a first layer of a material having a first refractive index alternates with a second layer of a material having a second refractive index,
  wherein the second refractive index is comparatively high as compared to the first refractive index.

The invention further relates to an interference film for use in an electric lamp.

Said interference films reflect and/or allow passage of radiation originating from different parts of the electromagnetic spectrum, for example ultraviolet, visible and/or infrared light. Such interference films are customarily provided as a coating on (the lamp vessel of) electric lamps and/or on reflectors. In this manner, the efficiency of an electric lamp is increased by applying a coating which reflects the infrared light, but which allows passage of the light radiation which is visible to the naked eye. The geometry of the electric lamp and/or of the reflector is such that the reflected radiation is reflected back to the light source which comprises, for example, a filament or a discharge. The reflected (heat) radiation is customarily used to assist in maintaining the operating temperature of the light source, thereby improving the energy balance of the electric lamp.

An electric lamp of the type mentioned in the opening paragraph is known from U.S. Pat. No. 5,138,219. In the known electric lamp, the material of the first layer consists of silicon oxide, and the material of the second layer consists of tantalum oxide having a refractive index which is high as compared to that of silicon oxide.

It is a drawback of the electric lamp that the degree to which the radiation reflected by the interference film contributes to the energy balance of the electric lamp is comparatively small, so that the efficiency increase also is comparatively small.

It is an object of the invention to provide an electric lamp of the type described in the opening paragraph, which electric lamp has an improved efficiency.

In accordance with the invention, the lamp of the type described in the opening paragraph is characterized in that, in the wavelength range from 400 to 760 nm, the interference film has a transmittance, on average, of at least 90%, and in the wavelength range from 800 to 2200 nm, the interference film has a reflectance, on average, of at least 75%.

An interference film with a high transmittance in the visible-light range (400–760 nm) and, simultaneously, a high reflectance in a comparatively wide part of the infrared range (800–2200 nm) of the electromagnetic spectrum leads to an increase of the quantity of (heat) radiation reflected by the interference film, which results in an improvement of the efficiency of the electric lamp. At a corresponding transmittance in the wavelength range from 400 to 760 nm, the known electric lamp has a reflectance in the infrared range which is lower than that of the lamp in accordance with the invention. In addition, this lower reflectance of the interference film of the known electric lamp is obtained in a wavelength range which is much smaller than that of the invention. The reflectance of the interference film in the known electric lamp is, on average, approximately 70% in a wavelength range from 800 to 1900 nm, while the reflectance of the interference film in the electric lamp in accordance with the invention is, on average, at least 75% in the wavelength range from 800 to 2200 nm.

Preferably, the reflectance in a wavelength range from 800 to 2500 nm is, on average, at least 85%. An interference film with such a high reflectance in a comparatively wide part of the infrared range (800–2500 nm) of the electromagnetic spectrum leads to a substantial increase of the quantity of (heat) radiation reflected by the interference film, which results in a substantial improvement of the efficiency of the electric lamp.

In conventional interference films for allowing passage of visible-light radiation and reflecting infrared radiation, which interference films are based on two materials having mutually different refractive indices, a plurality of conventional multilayer stacks of various design wavelengths are employed. Such conventional stacks are composed of three successive layers, namely a first layer (L) of the material having the first refractive index, a second layer (H) of the material having the second refractive index, and a third layer (L) of the material having the first refractive index. Such a conventional three-layer stack is represented in the following manner, which is known to those skilled in the art:

$$\left(\frac{L}{a} \quad \frac{H}{d} \quad \frac{L}{a}\right)^x$$

where
  $1 \leq a \leq 2$,
  $1 \leq d \leq 2,5$,
  $1 \leq x \leq 20$.

A drawback of the application of such a conventional stack resides in that the spectral width of the transmission window in the visible range is comparatively small. An increase of the effectiveness of the interference film in the infrared range of the electromagnetic spectrum is hardly possible and leads to a further narrowing of the spectral width of the transmission window in the visible range and, in addition, to undesirable interference peaks in the visible range.

The spectral width of the transmission window in the visible range can be increased in a manner which is known per se by using interference films based on three materials instead of two, the refractive index of the third material ranging between the refractive index of the first material and the refractive index of the second material. A layer comprising such a third layer material is often referred to as an intermediate layer (M). Although such a three-material approach to the interference film is practicable per se, it is not easy to find three materials which are suitable for said purpose and which, in the course of (industrially) applying the interference film to the lamp vessel of the electric lamp, can also be provided (sufficiently) independently of each other.

In the known lamp's interference film (U.S. Pat. No. 5,138,219) for allowing passage of visible-light radiation and reflecting infrared radiation, the third, intermediate layer material (M) is simulated by a combination of the two other layer materials. In this case, a three-material, five-layer stack of the structure:

$$\left( \frac{L}{a} \quad \frac{M}{b} \quad \frac{H}{d} \quad \frac{M}{b} \quad \frac{L}{a} \right)$$

where $2 \leq a, b \leq 4$, $1 \leq d \leq 2,5$, is converted to a two-material, seven-layer H-L stack of the structure:

$$\left( \frac{L}{a} \quad \frac{HL}{b'} \quad \frac{H}{d} \quad \frac{LH}{b'} \quad \frac{L}{a} \right)$$

where $2 \leq a \leq 4$, $5 \leq b' \leq 15$, $1 \leq d \leq 2,5$.

The drawback of interference films wherein such seven-layer stacks of two materials are employed resides in that the effective infrared reflectance is limited to a wavelength range from approximately 800 to 1900 nm. If it is necessary to also reflect infrared radiation of a longer wavelength ($\lambda > 1900$ nm), it is found that such seven-layer H-L stacks, considering the desired design wavelengths, cause undesirable side effects in the visible range, which lead to a decrease of the transmission window in the visible range as well as to the development of interference peaks in the center of the visible range. Such side effects adversely affect the appearance of the electric lamp and the color rendition of the light emitted by the light source. These interference peaks are so-called fifth-order reflectance peaks, which can be suppressed by means of a multilayer stack comprising two intermediate layer materials. Such a stack has the following structure:

$$\left( \frac{L}{a} \quad \frac{M_1}{b_1} \quad \frac{M_2}{b_2} \quad \frac{H}{d} \quad \frac{M_2}{b_2} \quad \frac{M_1}{b_1} \quad \frac{L}{a} \right)$$

where $2 \leq a \leq 4$, $2 \leq b_1, b_2 \leq 4$, $1 \leq d \leq 2,5$.

If finding one suitable intermediate layer material for the above-mentioned five-layer stack is substantially impossible, then this applies most certainly to finding, for this seven-layer stack, two suitable layer materials having a refractive index ranging between that of the layer having a high refractive index and the layer having a low refractive index. In the current invention, each one of these intermediate layer materials $M_1$ and $M_2$ is simulated by a suitable combination of layers of the other two layer materials, i.e. H and L.

A preferred embodiment of the electric lamp is characterized in that the interference film comprises at least a multilayer stack of at least eleven layers which are arranged such that a first layer (L) of the material having the first refractive index alternates with a second layer (H) of the material having the second refractive index, which multilayer stack has the following structure:

$$\left( \frac{L}{a} \quad \frac{HL}{b} \quad \frac{HL}{c} \quad \frac{H}{d} \quad \frac{LH}{c} \quad \frac{LH}{b} \quad \frac{L}{a} \right)$$

where $2 \leq a \leq 4$, $5 \leq b \leq 50$, $5 \leq c \leq 50$, $1 \leq d \leq 3$, Using such eleven-layer H-L stacks, the width of the infrared wavelength range that is effectively reflected can be substantially increased to a range from 800 to 2200 nm, preferably from 800 to 2500 nm, without an appreciable reduction of the transmittance in the visible range. Such an increase in width leads to an increase of the quantity of (heat) radiation reflected by the interference film, which results in an improved efficiency of the electric lamp. In addition, the use of such eleven-layer H-L stacks enables the effectiveness of the infrared reflection to be substantially increased throughout the effective wavelength range.

In the case of interference films based on two layer materials (H and L), the increase in reflectance to values above, on average, 80% in the infrared wavelength range without an extension into the far infrared range ($\lambda \geq 1900$ nm) generally leads to a substantial narrowing of the transmission window in the visible range (below 300 nm). The conversion of such filter designs for interference films in order to obtain a "normal" transmission window in the visible range leads to a loss of reflectance. The invention is based on the recognition that, while the desired "normal" transmission window in the visible range (400–760 nm) is preserved, the infrared reflection is increased to values of, on average, 85% or higher, and also the width of the reflection band in the infrared wavelength range is increased so as to range from 800 to 2200 nm, preferably from 800 to 2500 nm.

A preferred embodiment of the electric lamp is characterized in that the interference film comprises at least one further multilayer stack of at least seven layers, which are arranged such that the first layer (L) of the material having the first refractive index alternates with the second layer (H) of the material having the second refractive index, which further stack has the following structure:

$$\left( \frac{L}{a'} \quad \frac{HL}{b'} \quad \frac{H}{d'} \quad \frac{LH}{b'} \quad \frac{L}{a'} \right)$$

where $2 \leq a' \leq 4$, $5 \leq b' \leq 50$, $1 \leq d' \leq 3$,

The material of the first layer (L) having the first refractive index preferably mainly comprises silicon oxide.

The material of the second layer (H) having the second refractive index is preferably chosen from the group formed by titanium oxide, niobium oxide, zirconium oxide, hafnium oxide, tantalum oxide. These layers having a high refractive index may alternatively consist of a combination of two layers, for example of $TiO_2 \times ZrO_2$, $TiO_2 \times HfO_2$, $TiO_2 \times Nb_2O_5$, $TiO_2 \times Ta_2O_5$ or $Ta_2O_5 \times 2TiO_2$.

It has been found that an electric lamp provided with an interference film in accordance with the invention based on $Nb_2O_5$ as the material having the high refractive index and $SiO_2$ as the material having the low refractive index retains its initial properties throughout the service life of the lamp.

In an alternative interference film, a mixture of $Nb_2O_5 \times Ta_2O_5$ is used, which is particularly suitable if the operating temperature of the electric lamp is comparatively high. Experiments have shown that the filter design of such an interference film hardly needs adapting.

The light source of the lamp may be an incandescent body, for example in an halogen-containing gas, but it may alternatively be an electrode pair in an ionizable gas, for example an inert gas with metal halides, possibly with, for example, mercury as the buffer gas. The light source may be surrounded by an innermost gastight envelope. It is alternatively possible that an outermost envelope surrounds the lamp vessel.

The interference film can be provided in a customary manner, for example by physical vapor deposition (PVD) or (dc) (reactive) sputtering or by means of dip coating or LP-CVD (low-pressure chemical vapor deposition), PE-CVD (plasma-enhanced CVD).

These and other aspects of the invention will be apparent from and elucidated with reference to the embodiment(s) described hereinafter.

Figure 2:
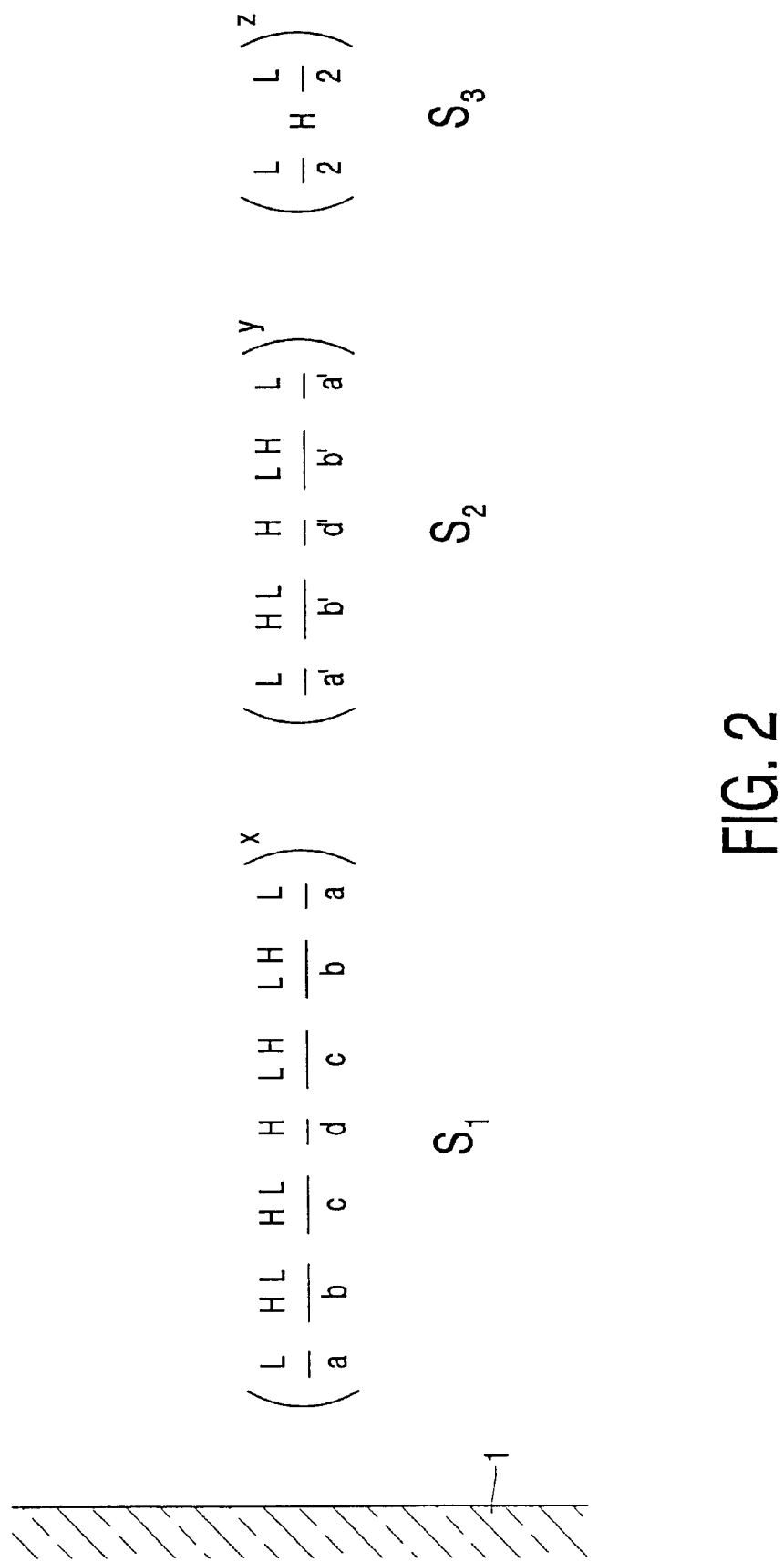
Figure 3:
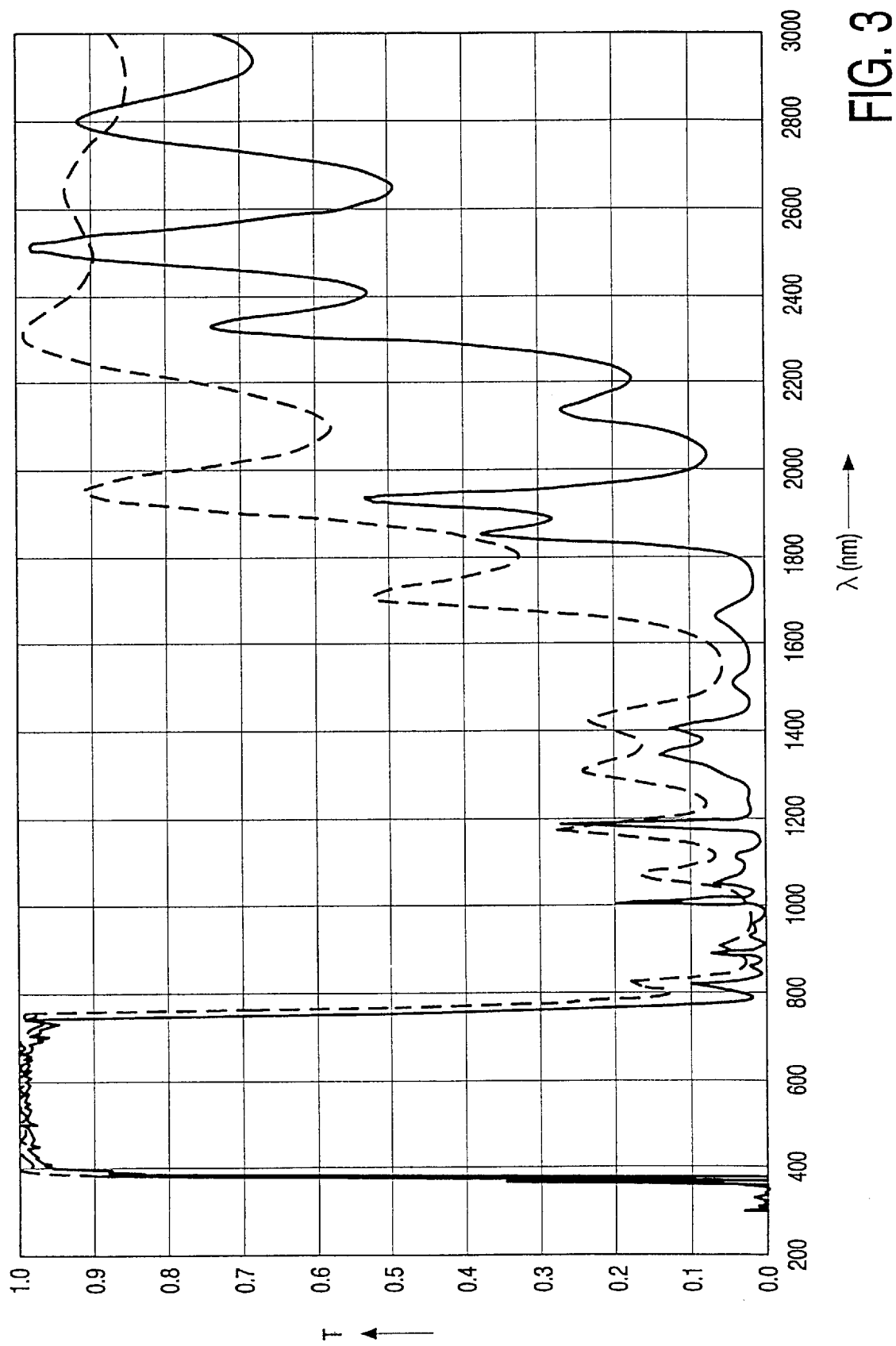

In the drawings:

FIG. 1 is a side view of an electric incandescent lamp;

FIG. 2 graphically shows an interference film in accordance with the invention, and FIG. 3 shows the transmission spectrum of an infrared-reflecting interference film of the electric lamp in accordance with the invention and of the electric lamp in accordance with the prior art.

The drawings are purely diagrammatic and not drawn to scale. Particularly for clarity, some dimensions are exaggerated strongly. In the Figures, like reference numerals refer to like parts whenever possible.

In FIG. 1, the electric lamp comprises a lamp vessel 1 of quartz glass accommodating an incandescent body as the light source 2. Current conductors 3, which issue from the lamp vessel 1 to the exterior, are connected to the light source 2. The lamp vessel 1 is filled with a gas containing halogen, for example hydrogen bromide. At least a part of the lamp vessel 1 is coated with an interference film 5, which comprises layers (see FIG. 2) which are arranged such that a first layer L of predominantly silicon oxide (refractive index of $SiO_2$, on average, approximately 1.45) alternates with a second layer H of a material having a comparatively high refractive index, in this example niobium oxide (refractive index of $Nb_2O_5$, on average, approximately 2.35). The interference film 5 allows passage of visible radiation and reflects infrared radiation.

The lamp vessel 1 is mounted in an outer bulb 4, which is supported by a lamp cap 6 with which the current conductors 3 are electrically connected. The lamp shown is a 60 W mains-operated lamp having a service life of at least substantially 2000 hours.

The interference film 5 of the electric lamp preferably comprises at least three multilayer spectrally adjacent stacks, each one of the stacks comprising at least a first layer L and a second layer H.

FIG. 2 graphically shows an interference film in accordance with the invention. Viewed from the substrate 1, the design of the interference film 5 comprises, in FIG. 2, a first stack, referenced S1, which, in accordance with the invention, comprises eleven layers which are arranged such that a layer L having a low refractive index alternates with a layer H having a high refractive index. The design wavelength $\lambda(S_1)$ of the first stack is 2100 nm. As the fifth-order reflection peaks are suppressed by the filter design in accordance with the invention, the next higher interference peak that may possibly occur, appears at $\lambda(S_1)/7=300$ nm, which is well outside the transmission window in the visible range (400–760 nm). In the design of the interference film in accordance with the invention, the stack $S_1$ is applied three times, in other words x=3 in FIG. 2 (see the periods A, B and C for the stack $S_1$ in Table I).

Following the first stack in FIG. 2, the interference film comprises a second stack, referenced $S_2$, which comprises seven layers which are arranged such that a layer L having a low refractive index alternates with a layer H having the high refractive index. Two types of second stack are used, namely at two different design wavelengths: $\lambda_1(S_2)=1700$ nm and $\lambda_2(S_2)=1300$ nm. As the third-order reflection peaks are suppressed by the filter design, the next higher interference peak that may possibly occur, appears at $\lambda_1(S_2)/5=340$ nm or at $\lambda_2(S_2)/5=260$ nm, which are both well outside the transmission window in the visible range (400–760 nm). In the design of the interference film in accordance with the invention, the stack $S_2$ is applied eleven times, in other words y=11 in FIG. 2 (see the periods A through K for the stack $S_2$ in Table I).

Following the second stack in FIG. 2, the interference film comprises a third stack of the so-called conventional type, referenced $S_3$, comprising three layers: a layer L having a low refractive index, a layer H having the high refractive index and again a layer L having the low refractive index. The design wavelength $\lambda(S_3)$ of the third stack is 900 nm. An interference peak of the third order appears at $\lambda(S_3)/3=300$ nm, which is well outside the transmission window in the visible range (400–760 nm). In the design of the interference film in accordance with the invention, the stack $S_3$ is used six times, in other words z=6 in FIG. 2 (see the periods A through F for the stack $S_3$ in Table I).

In summary, the interference film as shown in FIG. 2 is composed of an assembly of four spectrally adjacent stacks, namely:

a) a first stack $S_1$ comprising eleven H-L layers with a design wavelength $\lambda(S_1)=2100$ nm;

b) a second stack $S_2$ comprising seven H-L layers with a design wavelength $\lambda_1(S_2)=1700$ nm;

c) a further, second stack $S_2$ comprising seven H-L layers with a design wavelength $\lambda_2(S_2)=1300$ nm;

d) a third stack $S_3$ comprising three H-L layers with a design wavelength $\lambda(S_3)=1700$ nm.

How many times the various stacks $S_1$, $S_2$ and $S_3$ are repeated, in other words the choice for the exponents x, y and z, is determined on the basis of an analysis of the maximum increase of the reflectance per thickness increase of the filter design. Analysis has shown that it is very favorable to use an eleven-layer H-L stack in accordance with the invention if a high reflectance is desired. A further increase of the values for y and z generally does not lead to a wider infrared wavelength range and, in addition, has the disadvantage that the width of the transmission window in the visible range decreases. A decrease of the width of the transmission window in the visible range is undesirable because it causes the tolerance of the filter design with respect to variations in layer thickness occurring during the manufacturing process of the interference film to be reduced. Table I shows a filter design of an interference film for allowing passage of visible light and reflecting infrared radiation in accordance with the invention, which is comparatively insensitive to said design tolerances.

The (physical) layer thicknesses of the 109-layer H-L interference film in accordance with the invention shown in Table I are the result of computer optimizations, which are known per se, of a design of an infrared-reflecting optical interference film as described hereinabove.

TABLE I

Interference film in accordance with the invention:

| Layer | Material | optimized thickness (nm) | stack | period |
|---|---|---|---|---|
| 0 | Substrate | — | — | — |
| 1 | SiO₂ | 33.0 | S₁ | A |
| 2 | Nb₂O₅ | 2.1 | S₁ | A |
| 3 | SiO₂ | 57.4 | S₁ | A |
| 4 | Nb₂O₅ | 12.3 | S₁ | A |
| 5 | SiO₂ | 28.9 | S₁ | A |
| 6 | Nb₂O₅ | 83.7 | S₁ | A |
| 7 | SiO₂ | 3.7 | S₁ | A |
| 8 | Nb₂O₅ | 32.6 | S₁ | A |
| 9 | SiO₂ | 35.3 | S₁ | A |
| 10 | Nb₂O₅ | 13.6 | S₁ | A |
| 11 | SiO₂ | 334.2 | S₁ | A/B |
| 12 | Nb₂O₅ | 6.6 | S₁ | B |
| 13 | SiO₂ | 36.4 | S₁ | B |
| 14 | Nb₂O₅ | 22.1 | S₁ | B |
| 15 | SiO₂ | 16.4 | S₁ | B |
| 16 | Nb₂O₅ | 161.0 | S₁ | B |
| 17 | SiO₂ | 8.8 | S₁ | B |
| 18 | Nb₂O₅ | 34.0 | S₁ | B |
| 19 | SiO₂ | 31.1 | S₁ | B |
| 20 | Nb₂O₅ | 17.1 | S₁ | B |
| 21 | SiO₂ | 228.4 | S₁ | B/C |
| 22 | Nb₂O₅ | 15.8 | S₁ | C |
| 23 | SiO₂ | 44.4 | S₁ | C |
| 24 | Nb₂O₅ | 36.6 | S₁ | C |
| 25 | SiO₂ | 15.6 | S₁ | C |
| 26 | Nb₂O₅ | 139.7 | S₁ | C |
| 27 | SiO₂ | 5.9 | S₁ | C |
| 28 | Nb₂O₅ | 17.6 | S₁ | C |
| 29 | SiO₂ | 23.9 | S₁ | C |
| 30 | Nb₂O₅ | 17.7 | S₁ | C |
| 31 | SiO₂ | 219.9 | S₂ | C/A |
| 32 | Nb₂O₅ | 15.2 | S₂ | A |
| 33 | SiO₂ | 33.7 | S₂ | A |
| 34 | Nb₂O₅ | 119.7 | S₂ | A |
| 35 | SiO₂ | 31.7 | S₂ | A |
| 36 | Nb₂O₅ | 13.0 | S₂ | A |
| 37 | SiO₂ | 361.2 | S₂ | A/B |
| 38 | Nb₂O₅ | 13.3 | S₂ | B |
| 39 | SiO₂ | 29.4 | S₂ | B |
| 40 | Nb₂O₅ | 110.4 | S₂ | B |
| 41 | SiO₂ | 23.7 | S₂ | B |
| 42 | Nb₂O₅ | 14.2 | S₂ | B |
| 43 | SiO₂ | 189.2 | S₂ | B/C |
| 44 | Nb₂O₅ | 17.3 | S₂ | C |
| 45 | SiO₂ | 22.6 | S₂ | C |
| 46 | Nb₂O₅ | 106.9 | S₂ | C |
| 47 | SiO₂ | 24.9 | S₂ | C |
| 48 | Nb₂O₅ | 15.4 | S₂ | C |
| 49 | SiO₂ | 218.8 | S₂ | C/D |
| 50 | Nb₂O₅ | 18.8 | S₂ | D |
| 51 | SiO₂ | 27.7 | S₂ | D |
| 52 | Nb₂O₅ | 130.7 | S₂ | D |
| 53 | SiO₂ | 32.3 | S₂ | D |
| 54 | Nb₂O₅ | 14.9 | S₂ | D |
| 55 | SiO₂ | 361.9 | S₂ | D/E |
| 56 | Nb₂O₅ | 13.5 | S₂ | E |
| 57 | SiO₂ | 29.0 | S₂ | E |
| 58 | Nb₂O₅ | 110.2 | S₂ | E |
| 59 | SiO₂ | 29.9 | S₂ | E |
| 60 | Nb₂O₅ | 14.4 | S₂ | E |
| 61 | SiO₂ | 222.1 | S₂ | E/F |
| 62 | Nb₂O₅ | 13.0 | S₂ | F |
| 63 | SiO₂ | 33.1 | S₂ | F |
| 64 | Nb₂O₅ | 112.0 | S₂ | F |
| 65 | SiO₂ | 32.67 | S₂ | F |
| 66 | Nb₂O₅ | 11.1 | S₂ | F |
| 67 | SiO₂ | 304.1 | S₂ | F/G |
| 68 | Nb₂O₅ | 14.3 | S₂ | G |
| 69 | SiO₂ | 26.0 | S₂ | G |
| 70 | Nb₂O₅ | 102.6 | S₂ | G |
| 71 | SiO₂ | 22.6 | S₂ | G |
| 72 | Nb₂O₅ | 14.0 | S₂ | G |
| 73 | SiO₂ | 174.3 | S₂ | G/H |
| 74 | Nb₂O₅ | 13.8 | S₂ | H |
| 75 | SiO₂ | 26.8 | S₂ | H |
| 76 | Nb₂O₅ | 110.1 | S₂ | H |
| 77 | SiO₂ | 18.5 | S₂ | H |
| 78 | Nb₂O₅ | 12.9 | S₂ | H |
| 79 | SiO₂ | 169.3 | S₂ | H/I |
| 80 | Nb₂O₅ | 18.2 | S₂ | I |
| 81 | SiO₂ | 19.8 | S₂ | I |
| 82 | Nb₂O₅ | 109.2 | S₂ | I |
| 83 | SiO₂ | 19.8 | S₂ | I |
| 84 | Nb₂O₅ | 18.7 | S₂ | I |
| 85 | SiO₂ | 174.5 | S₂ | I/J |
| 86 | Nb₂O₅ | 11.6 | S₂ | J |
| 87 | SiO₂ | 19.5 | S₂ | J |
| 88 | Nb₂O₅ | 87.5 | S₂ | J |
| 89 | SiO₂ | 11.8 | S₂ | J |
| 90 | Nb₂O₅ | 16.7 | S₂ | J |
| 91 | SiO₂ | 193.0 | S₂ | J/K |
| 92 | Nb₂O₅ | 19.0 | S₂ | K |
| 93 | SiO₂ | 22.1 | S₂ | K |
| 94 | Nb₂O₅ | 93.8 | S₂ | K |
| 95 | SiO₂ | 13.6 | S₂ | K |
| 96 | Nb₂O₅ | 15.9 | S₂ | K |
| 97 | SiO₂ | 161.1 | S₂/S₃ | K/A |
| 98 | Nb₂O₅ | 96.0 | S₃ | A |
| 99 | SiO₂ | 160.7 | S₃ | A/B |
| 100 | Nb₂O₅ | 88.3 | S₃ | B |
| 101 | SiO₂ | 154.5 | S₃ | B/C |
| 102 | Nb₂O₅ | 92.6 | S₃ | C |
| 103 | SiO₂ | 155.8 | S₃ | C/D |
| 104 | Nb₂O₅ | 89.7 | S₃ | D |
| 105 | SiO₂ | 155.9 | S₃ | D/E |
| 106 | Nb₂O₅ | 92.4 | S₃ | E |
| 107 | SiO₂ | 165.1 | S₃ | E/F |
| 108 | Nb₂O₅ | 93.5 | S₃ | F |
| 109 | SiO₂ | 79.8 | S₃ | F |
|  | air | — | — |  |

In the interference film of Table I, the overall thickness of Nb₂O₅ is 2687 nm and that of SiO₂ is 5077 nm.

The relevant part of the lamp vessel 1 is covered with the interference film 5 in accordance with the invention by means of reactive sputtering. In the case of reactive sputtering, the layers of SiO₂ are obtained by sputtering Si in an environment of Ar and O₂. Typical conditions are: a pressure of 400–1400 Pa (3–10 mtorr) Ar and a pressure of 25–50 Pa (0.2–0.4 mtorr) O₂. Also the material having the high refractive index is obtained by sputtering the metallic material in an Ar/O₂ mixture. Typical conditions are: a pressure of 400–1400 Pa (3–10 mtorr) Ar and a pressure of 40–140 Pa (0.3–1.0 mtorr) O₂. For both materials, the Ar pressure is generally checked by means of a constant flow, and the oxygen pressure (?) is checked by means of a specific oxygen sensor. The sputter process takes place in a temperature range from 20 to 100° C.

The interference film 5 in accordance with the invention remained intact and retain its initial properties throughout the service life of the electric lamp.

FIG. 3 shows the transmission spectrum as a function of the wavelength λ (in nm) of an infrared-reflecting interference film composed of 47 alternate layers of SiO₂ and Nb₂O₅, which is known per se (spectrum indicated by means of a continuous line), which is compared with the infrared-reflecting interference film composed of 109 alternate layers of SiO₂ Nb₂O₅ (see FIG. 2 and Table I). In the visible wavelength range from 400 to 760 nm, the transmittance of the interference film in accordance with the invention and that of the known interference film is generally above, on average, at least 90%.

The electric lamp provided with the 47-layer $Ta_2O_5/SiO_2$ interference film as shown in U.S. Pat. No. 5,138,219 has a reflectance of, on average, approximately 67% in the wavelength range from 800 to 1900 nm. The electric lamp provided with the 47-layer $Nb_2O_5/SiO_2$ interference film as described hereinabove has a reflectance of, on average, approximately 70% in the wavelength range from 800 to 1900 nm. The electric lamp provided with the interference film as shown in Table I has a reflectance of, on average, 90% in a wavelength range from 800 to 2500 nm. The high efficiency of the reflected (heat) radiation has a positive effect on the energy balance of the electric lamp, so that an electric lamp having a high efficiency is obtained.

It will be clear that, within the scope of the invention, many variations are possible to those skilled in the art.

The scope of protection of the invention is not limited to the examples given herein. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An electric lamp comprising a light-transmitting lamp vessel (1) in which a light source (2) is arranged,
   wherein at least a portion of the lamp vessel (2) is provided with an interference film (5) for allowing passage of visible-light radiation and reflecting infrared radiation,
   wherein the interference film (5) comprises layers (L, H) which are arranged such that a first layer (L) of a material having a first refractive index alternates with a second layer (H) of a material having a second refractive index,
   wherein the second refractive index is comparatively high as compared to the first refractive index, characterized in that,
   in the wavelength range from 400 to 760 nm, the interference film (5) has a transmittance, on average, of at least 90%, and
   in the wavelength range from 800 to 2200 nm, the interference film (5) has a reflectance, on average, of at least 75%.

2. An electric lamp as claimed in claim 1, characterized in that the reflectance in a wavelength range from 800 to 2500 nm is, on average, at least 85%.

3. An electric lamp as claimed in claim 1, characterized in that the interference film (5) comprises at least a multilayer stack of at least eleven layers which are arranged such that a first layer (L) of the material having the first refractive index alternates with a second layer (H) of the material having the second refractive index, which multilayer stack has the following structure:

$$\left( \frac{L}{a} \quad \frac{HL}{b} \quad \frac{HL}{c} \quad \frac{H}{d} \quad \frac{LH}{c} \quad \frac{LH}{b} \quad \frac{L}{a} \right)$$

where
   $2 \leq a \leq 4$,
   $5 \leq b \leq 50$,
   $5 \leq c \leq 50$,
   $1 \leq d \leq 3$.

4. An electric lamp as claimed in claim 3, characterized in that the interference film (5) comprises at least one further multilayer stack of at least seven layers, which are arranged such that the first layer (L) of the material having the first refractive index alternates with the second layer (H) of the material having the second refractive index, which further stack has the following structure:

$$\left( \frac{L}{a'} \quad \frac{HL}{b'} \quad \frac{H}{d'} \quad \frac{LH}{b'} \quad \frac{L}{a'} \right)$$

where
   $2 \leq a' \leq 4$,
   $5 \leq b' \leq 50$,
   $1 \leq d' \leq 3$.

5. An electric lamp as claimed in claim 4, characterized in that the interference film (5) comprises at least three multilayer spectrally adjacent stacks, each one of the stacks comprising at least a first layer (L) and a second layer (H).

6. An electric lamp as claimed in claim 1, characterized in that the material of the first layer (L) having the first refractive index predominantly comprises silicon oxide.

7. An electric lamp as claimed in claim 6, characterized in that the material of the second layer (H) having the second refractive index is preferably chosen from the group formed by titanium oxide, niobium oxide, zirconium oxide, hafnium oxide, tantalum oxide and combinations of said materials.

8. An interference film for use in an electric lamp as claimed in claim 1.

* * * * *